(No Model.)  2 Sheets—Sheet 1.
J. C. MILLER.
JOURNAL BOX.
No. 382,893. Patented May 15, 1888.
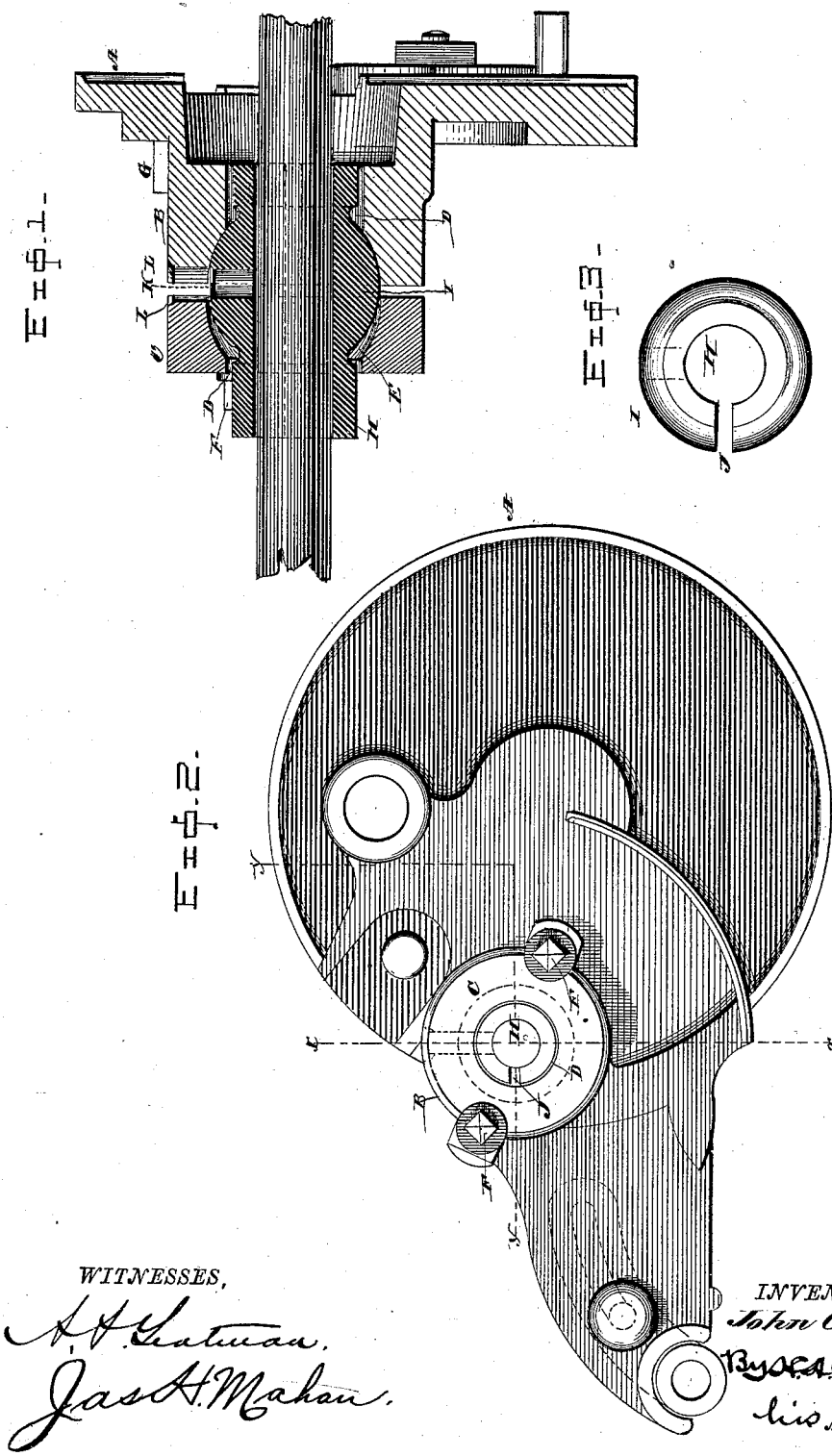
WITNESSES,
INVENTOR.
John C. Miller,
By C. A. Toulmin,
his Attorney.

(No Model.) 2 Sheets—Sheet 2.
J. C. MILLER.
JOURNAL BOX.
No. 382,893. Patented May 15, 1888.
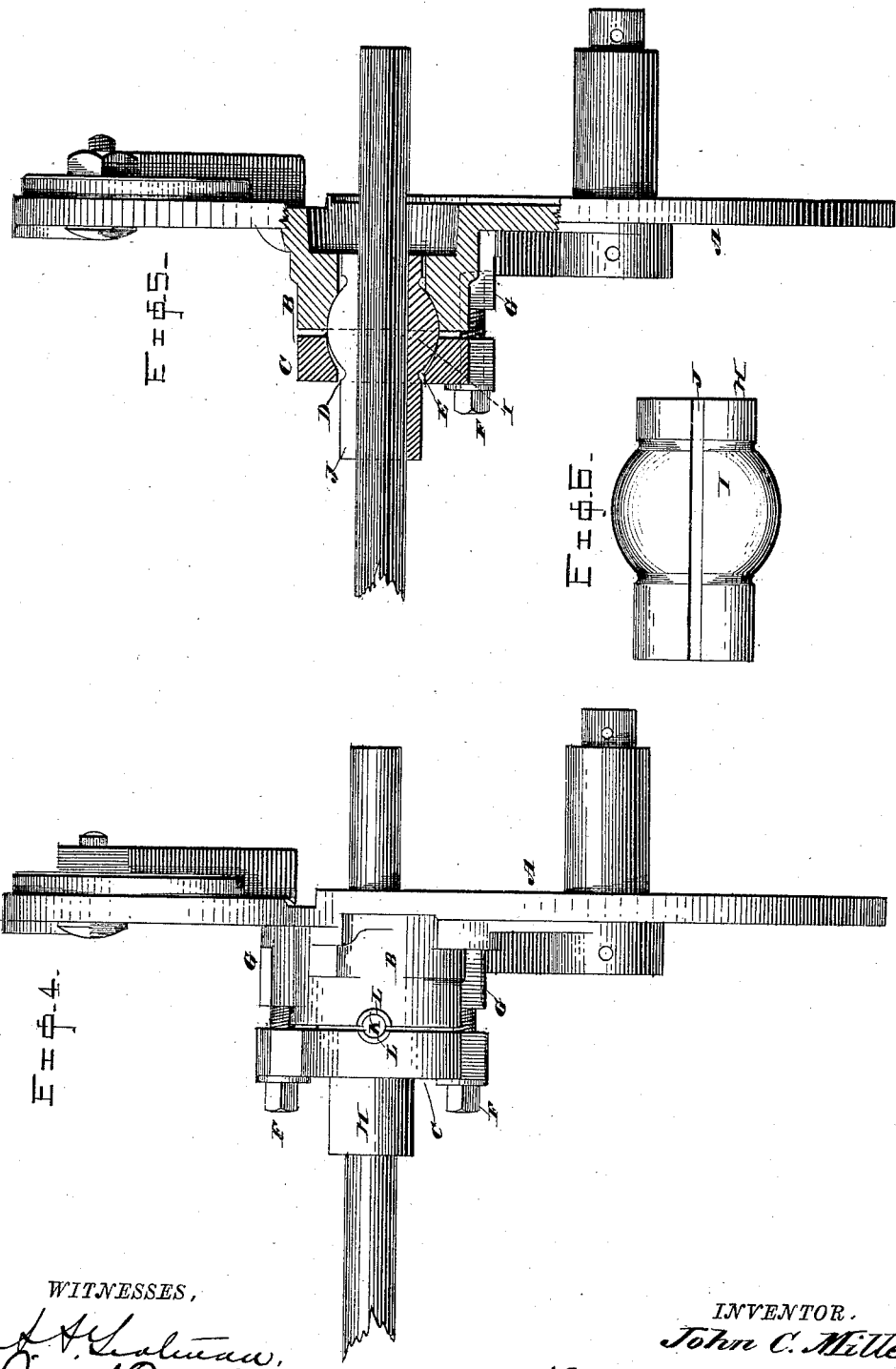
WITNESSES,
INVENTOR,
John C. Miller
By L. A. Toulmin
his Attorney

UNITED STATES PATENT OFFICE.

JOHN C. MILLER, OF SPRINGFIELD, OHIO, ASSIGNOR TO THE THOMAS MANUFACTURING COMPANY, OF SAME PLACE.

JOURNAL-BOX.

SPECIFICATION forming part of Letters Patent No. 382,893, dated May 15, 1888.

Application filed September 7, 1887. Serial No. 249,005. (No model.)

*To all whom it may concern:*

Be it known that I, JOHN C. MILLER, a citizen of the United States, residing at Springfield, in the county of Clark and State of Ohio, have invented certain new and useful Improvements in Journal-Boxes, of which the following is a specification, reference being had therein to the accompanying drawings.

This invention relates to certain new and useful improvements in journal-boxes for shafts. The objects which I have in view are, first, to provide a shaft-bearing which will adjust itself in the box in which it is fitted to agree with the direction of the shaft, so as to allow it to run freely, even though its journal is not perfectly true and though it is not itself perfectly straight, and even though one bearing is not in accurate alignment with the other bearing of the shaft, and, secondly, to provide for taking up the space between the shaft-journal and the bearing as one or both wear away by usage.

With these ends in view my invention consists of the peculiarities hereinafter apparent.

In the accompanying drawings, forming a part of this specification, and on which like reference-letters indicate corresponding parts, Figure 1 represents a vertical sectional view of my improved journal-box, showing its application to the side plate of a hand lawn-mower, taken on the line $x\,x$ of Fig. 2; Fig. 2, a side elevation of a side plate of a lawn-mower, showing an end of my improved bearing; Fig. 3, a detail view of the bearing alone; Fig. 4, a plan view of a side plate of a lawn-mower, showing the journal-box applied thereto and a portion of the reel-shaft therein; Fig. 5, a sectional view on the line $y\,y$ of Fig. 2, also showing a portion of the reel-shaft applied to the journal-box; and Fig. 6, a detail plan view of the bearing.

Before entering upon a detail description of my invention it is proper to observe that it is applicable to and useful in various places and machines where shafts are used; but for the purpose of illustrating one application of it I have associated it in the accompanying drawings with a side plate, A, of any approved type of lawn-mower, from which extends the boss B, which constitutes one part of the journal-box. The other part of said box is composed of a stout metallic plate or cap, C. These parts are bored out or otherwise provided with a passage, D, and this passage is enlarged at and near the adjacent faces of the two parts of the box, so as to form a somewhat spherical recess, E. Binding-screws F pass through the cap C and enter enlargements G on the sides of the part B of the box, and serve to draw the cap toward the part B and against the spherical portion of the sleeve or the bearing proper, now about to be described.

The letter H designates the sleeve or the bearing proper, which is made of any proper material for the purpose in view, and about the middle thereof is enlarged and fashioned on its exterior so as to form substantially a sphere, I, which is fitted snugly into one or the other of the parts of the box. As shown in Figs. 1 and 5, it is snugly fitted into the part B, while the part or cap C binds against the sphere I and presses it properly against the part B. It will be observed that the connection between the bearing and the box is such that the bearing may have a universal movement or adjustment within the proper limits, so as to bring its bore in line with the direction of the shaft, irrespective of whether the box is in perfect alignment with the box which supports the other end or portion of the shaft. The difficulty of getting two bearings in precise alignment with each other, so as to allow a shaft to run smoothly and without binding, is well known in mechanics, and requires nice workmanship both in construction and in placing the box, as also in turning the shaft to get it perfectly true. Again, the slightest lack of true alignment between the bearings will cause the shaft to bind and work hard. These difficulties are overcome by this invention, as the bearing, as I have found in practice, will assume the position required by that of the shaft when the shaft is inserted into it. When in this position, it can be secured firmly by simply manipulating the screws F. The bearing has an incision at J in the wall thereof, which allows it to be compressed by the clamping action of the parts of the box. By this means the diameter of the bore can be slightly contracted from time to time, as the wear occurs between the bearing and the journal of the shaft. Thus lost motion and rattling are overcome.

An oil-hole is provided at K in the sleeve, into which oil can be poured through coincident recesses L, formed in the parts of the box.

Instead of slipping the shaft into the bearing, in some class of machines, as in lawn-mowers, it is convenient to place the shaft in the box at either side of the machine and then slip the sleeves or bearings over the ends of the shaft, and after that to put the caps C over the bearings.

Having thus fully described my invention, what I claim as new, and desire to secure by Letters Patent, is—

1. In a journal-box, the combination, with a slotted sleeve having a sphere-like enlargement, of the box proper, composed of two parts whose adjacent faces are each provided with a spherical enlargement which embraces the said sphere-like enlargement, with a space between them, and devices to draw the said parts toward each other and axially to the sleeve, whereby the sleeve is compressed and its interior shaft-journal reduced in diameter.

2. In a journal-box, the combination, with the box proper, composed of two vertical parts having horizontal openings therein and whose adjacent faces are each provided with a spherical enlargement and devices to draw said parts together, of a compressible bearing fitted within said box, composed of a slotted sleeve loosely fitted in said openings and having a sphere-like enlargement within the said spherical enlargement of the box proper, and compressible by drawing the parts together in a direction longitudinally to the slot in the sleeve.

In testimony whereof I affix my signature in presence of two witnesses.

JOHN C. MILLER.

Witnesses:
  O. J. EDWARDS,
  JAS. JOHNSON, Jr.